(No Model.)
S. W. TANNER.
CAR WHEEL.
No. 358,951. Patented Mar. 8, 1887.
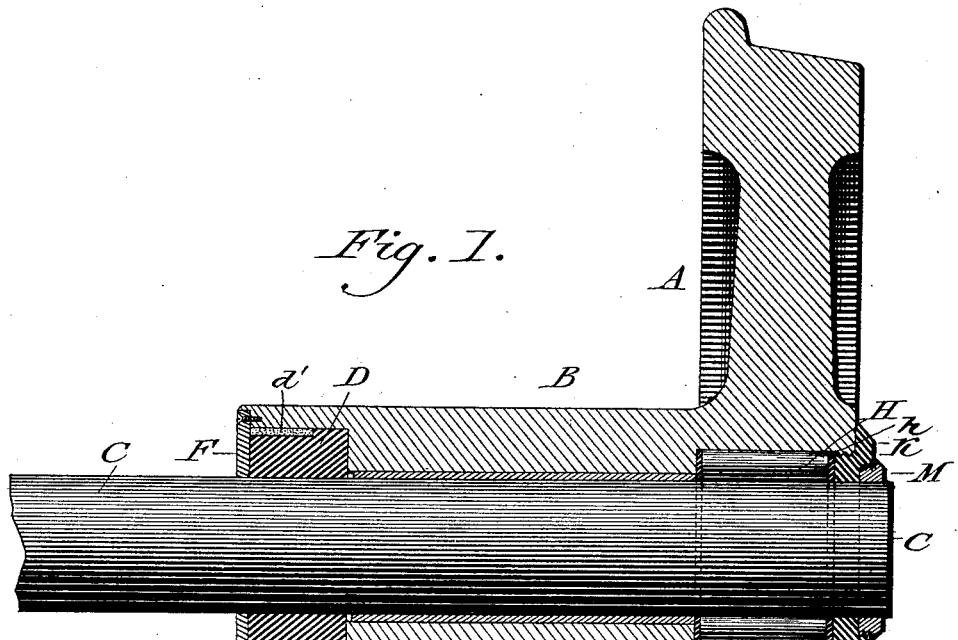
Fig. 1.
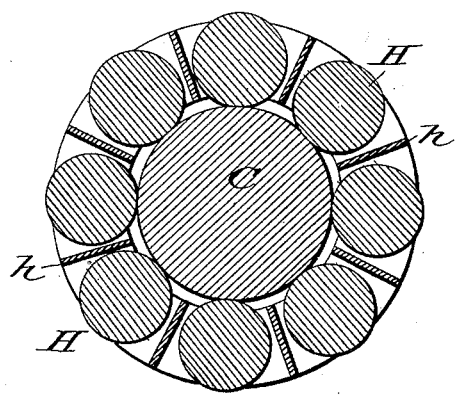
Fig. 2.
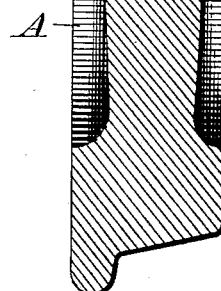
WITNESSES:
INVENTOR
Samuel W. Tanner
by his attorney

UNITED STATES PATENT OFFICE.

SAMUEL W. TANNER, OF PHILADELPHIA, PENNSYLVANIA.

CAR-WHEEL.

SPECIFICATION forming part of Letters Patent No. 358,951, dated March 8, 1887.

Application filed December 1, 1886. Serial No. 220,336. (No model.)

*To all whom it may concern:*

Be it known that I, SAMUEL W. TANNER, of the city and county of Philadelphia, State of Pennsylvania, have invented a new and useful Improvement in Car-Wheels, of which the following is a true and exact description, due reference being had to the accompanying drawings, which form part hereof.

My invention relates most particularly to the means whereby the wheel is retained in a constant position in reference to the axle upon which it revolves, and also means whereby the friction of the wheel upon the axle is reduced to its minimum.

In the drawings which accompany and form part of this specification, Figure 1 represents the improved method of connecting the loose wheel with the axle. Fig. 2 represents the improved method of reducing the friction of the bearing-surfaces to a minimum.

A is the wheel; B, the hub, which in my invention is made of much greater length than as ordinarily constructed.

C is the axle, upon which the wheel A revolves loosely. This axle C has upon it at some distance from the wheel a flange or collar, D.

The elongated hub B is constructed as shown in Fig. 1 of the drawings, having a portion of its surface cut away at its inner end; or it is partially filled up for a portion of its extent. This surface, cut away or not, partially filled up, passes over the flange or collar D; but when the greater surface of the hub is reached it cannot pass beyond this flange or collar, and the wheel A is thus prevented from moving in one direction. In this flange or collar D a portion, $d'$, may be cut out and packing inserted to keep the wheel free from dust. A cap, F, is screwed on the end of the elongated hub. The wheel may be prevented from moving in an outward direction by a box and screw or any well-known means, or in such a manner as will hereinafter be set out in this specification.

The means by which I reduce the friction of the bearing-surfaces is shown in Figs. 1 and 2. I place a number of rollers, H, surrounding and so that one of their surfaces touches the periphery of the axle C of the vehicle. The other surface of the rollers touches the periphery of the bearing-surface of the wheel A. The length of these rollers H is preferably slightly less than the length of the bearing-surface of the wheel. These rollers are retained in position by a series of slides, $h$, and the rollers are prevented from sliding along the axle or bearing-surface of the wheel by the following means: The end of the bearing-surface I, which projects beyond the rollers H, has a thread cut upon it, upon which is screwed the collar K, having the projection $k$, when the collar is screwed in to its limit, the inner end of the collar presses against the roller H, and the projection $k$ of the collar presses against the wheel A, thus preventing any lateral motion of the rollers. The inner ends of the rollers reach to the projecting hub. The outer portion of this collar is cut off and threaded, upon which is screwed the cap M. Between this cap M and the collar K any desired packing may be placed, in order to keep the surfaces free from dust or dirt.

Having now fully described my invention, what I claim, and desire to protect by Letters Patent, is—

1. In combination, a wheel loosely journaled having a projecting hub and an axle having a flange, said hub having a portion of its outer end made of greater internal diameter than the remainder of the hub.

2. In combination, a wheel loosely journaled having a projecting hub, B, an axle, C, having a flange, D, said flange having a portion of its surface $d'$ cut away, and the cap F, substantially as and for the purpose described.

3. In combination, the roller H, threaded surface J, threaded collar K, having projection $k$, substantially as and for the purpose described.

4. In combination, threaded collar having a portion of its surface cut out and threaded, and a cap, M, substantially as and for the purpose described.

5. In combination, the axle C, loosely-journaled wheel A, rollers H, retained in position between the bearing-surface of wheel A and hub B by slides $h$, threaded end J, threaded collar K, having projection $k$, said collar having a portion of its surface $l$ removed and threaded, and cap M, substantially as and for the purpose described.

SAMUEL W. TANNER.

Witnesses:
RICHD. S. CHILD, Jr.,
JOSHUA WALLACE, Jr.